United States Patent
Kuriyagawa et al.

(10) Patent No.: US 8,202,135 B2
(45) Date of Patent: Jun. 19, 2012

(54) OUTBOARD MOTOR CONTROL APPARATUS

(75) Inventors: Koji Kuriyagawa, Saitama (JP); Hajime Yoshimura, Saitama (JP); Hikaru Ikeda, Saitama (JP); Yoshiyuki Matsuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 340 days.

(21) Appl. No.: 12/580,790

(22) Filed: Oct. 16, 2009

(65) Prior Publication Data
US 2010/0099310 A1   Apr. 22, 2010

(30) Foreign Application Priority Data
Oct. 20, 2008   (JP) .................................. 2008-270216

(51) Int. Cl.
*B63H 21/22* (2006.01)
(52) U.S. Cl. .................. 440/1; 440/75; 440/84
(58) Field of Classification Search ................ 440/1, 75, 440/84
See application file for complete search history.

(56) References Cited

U.S. PATENT DOCUMENTS

| 4,558,769 A * | 12/1985 | Neisen .......................... 192/3.31 |
| 4,887,984 A | 12/1989 | Newman |
| 5,095,776 A | 3/1992 | Sato |
| 5,336,120 A * | 8/1994 | Maurer et al. .................. 440/84 |
| 5,754,969 A | 5/1998 | Ando et al. |
| 6,513,463 B2 | 2/2003 | Katayama |
| 6,899,575 B1 | 5/2005 | Rothe et al. |
| 7,121,233 B2 | 10/2006 | Kitamura et al. |
| 7,214,164 B2 | 5/2007 | Shomura et al. |
| 7,578,713 B2 * | 8/2009 | Miyata et al. .................. 440/75 |
| 7,744,435 B2 | 6/2010 | Ide et al. |
| 2005/0230207 A1 | 10/2005 | Tsunekawa |
| 2007/0293103 A1 * | 12/2007 | Kinoshita et al. ................. 440/1 |

FOREIGN PATENT DOCUMENTS

| EP | 1 860 347 A2 | 11/2007 |
| JP | 0 430 675 A2 | 6/1991 |
| JP | 2007-315498 A | 12/2007 |

* cited by examiner

*Primary Examiner* — Stephen Avila
(74) *Attorney, Agent, or Firm* — Carrier Blackman & Associates, P.C.; Joseph P. Carrier; William D. Blackman (57) ABSTRACT

In an apparatus for controlling an outboard motor mounted on a stern of a boat and having an internal combustion engine to power a propeller, a drive shaft that connects the engine and the propeller, and a torque converter that is interposed between the engine and the drive shaft and is equipped with a lockup clutch, it is configured to have a planing determiner that determines whether the boat is planing and a clutch ON unit that makes the lockup clutch ON when the boat is determined to be planing. With this, it becomes possible to appropriately make the lockup clutch ON after completing acceleration, thereby improving speed performance.

6 Claims, 6 Drawing Sheets

OUTBOARD MOTOR CONTROL APPARATUS

BACKGROUND OF THE INVENTION

1. Field of the Invention

This invention relates to an outboard motor control apparatus, particularly to an apparatus for controlling an outboard motor having a torque converter.

2. Description of the Related Art

In recent years, there is proposed an outboard motor having a torque converter interposed between an internal combustion engine and drive shaft to amplify output torque of the engine and then transmit it to the drive shaft for enhancing acceleration performance, etc., as taught, for example, by Japanese Laid-Open Patent Application No. 2007-315498 ('498). In this conventional technique, the torque converter includes a lockup clutch.

However, in the outboard motor having the torque converter as in the reference, although use of the torque converter improves acceleration performance, sufficient speed can not be acquired after completing acceleration (after amplification of the torque through the torque converter is completed) due to slippage of the torque converter, disadvantageously. This defect may be dealt with by promptly making the lockup clutch ON (i.e., engaged) after completing acceleration to prevent the torque converter slippage, but the reference does not disclose any technique concerning it.

SUMMARY OF THE INVENTION

An object of this invention is therefore to overcome the foregoing drawback by providing an apparatus for controlling an outboard motor having a torque converter, which apparatus appropriately makes the lockup clutch ON after completing acceleration, thereby improving speed performance.

In order to achieve the object, this invention provides an apparatus for controlling an outboard motor mounted on a stern of a boat and having an internal combustion engine to power a propeller, a drive shaft that connects the engine and the propeller, and a torque converter that is interposed between the engine and the drive shaft and is equipped with a lockup clutch, comprising a planing determiner that determines whether the boat is planing, and a clutch ON unit that makes the lockup clutch ON when the boat is determined to be planing.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A preferred embodiment of an outboard motor control apparatus according to the invention will now be explained with reference to the attached drawings.

Figure 1:
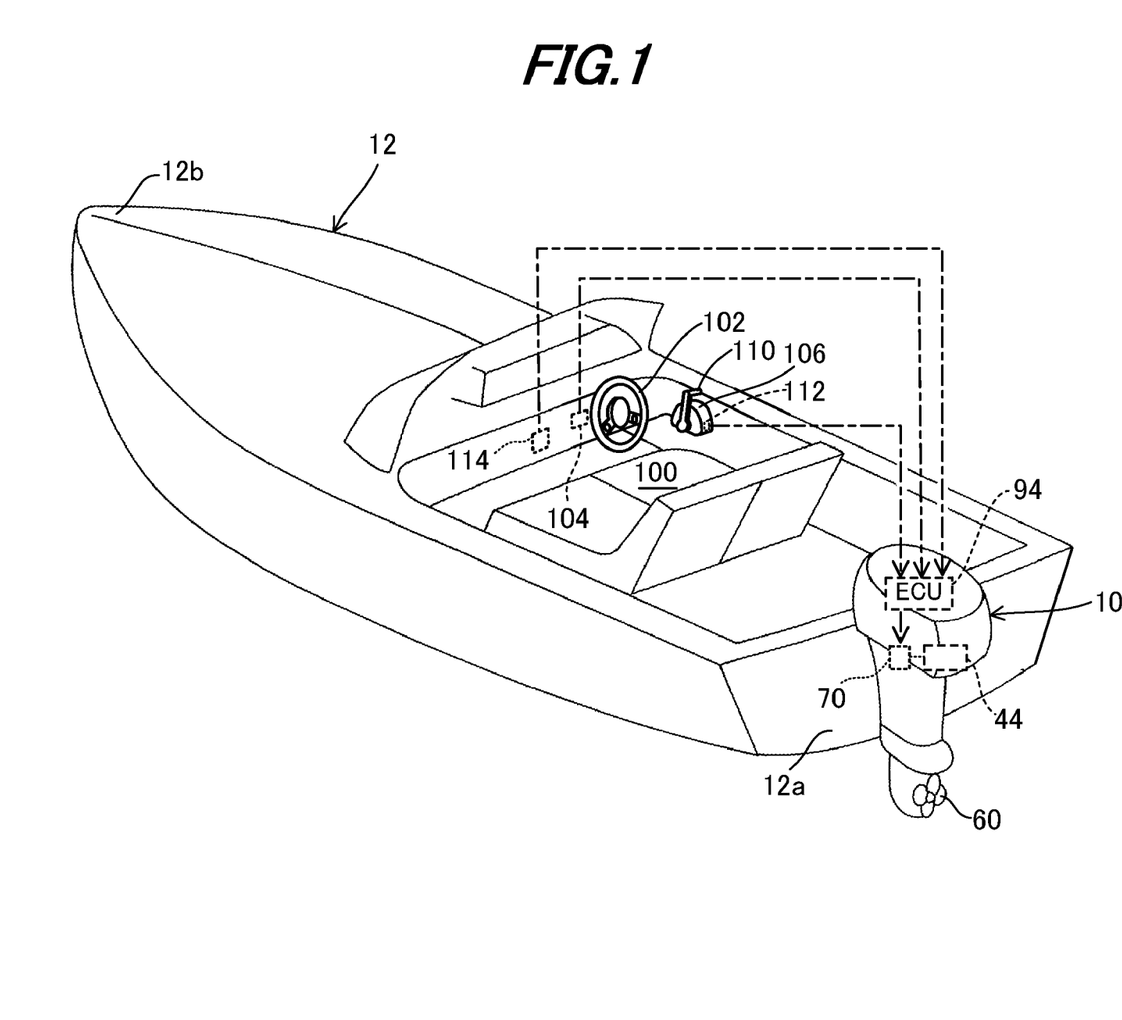
FIG. 1 is an overall schematic view of an outboard motor control apparatus including a boat (hull) according to an embodiment of the invention.
Figure 2:
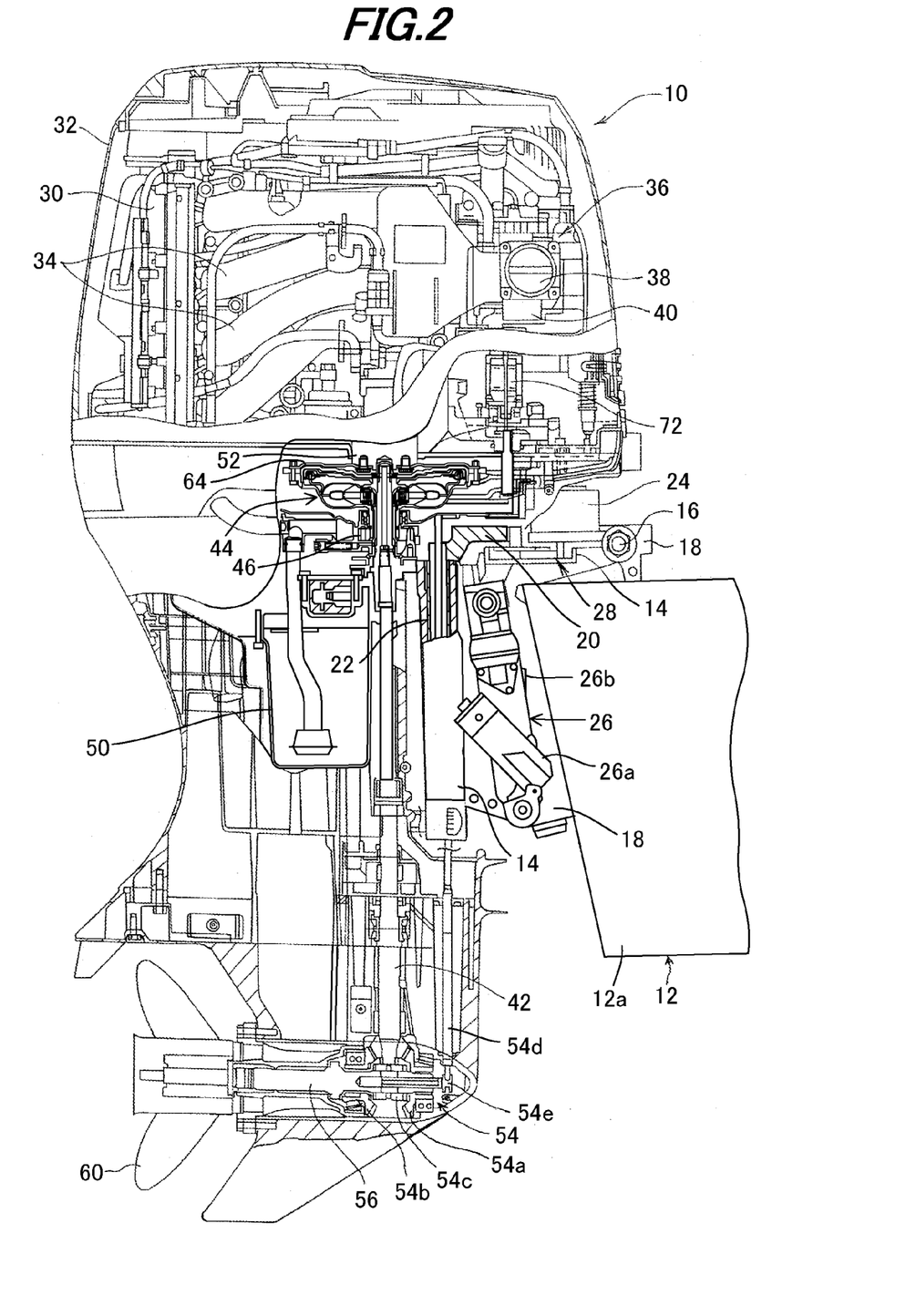
FIG. 2 is a sectional side view partially showing the outboard motor shown in FIG. 1.

FIG. 1 is an overall schematic view of an outboard motor control apparatus including a boat (hull) according to an embodiment of the invention. FIG. 2 is a sectional side view partially showing the outboard motor shown in FIG. 1 and FIG. 3 is an enlarged side view of the outboard motor.

Figure 3:
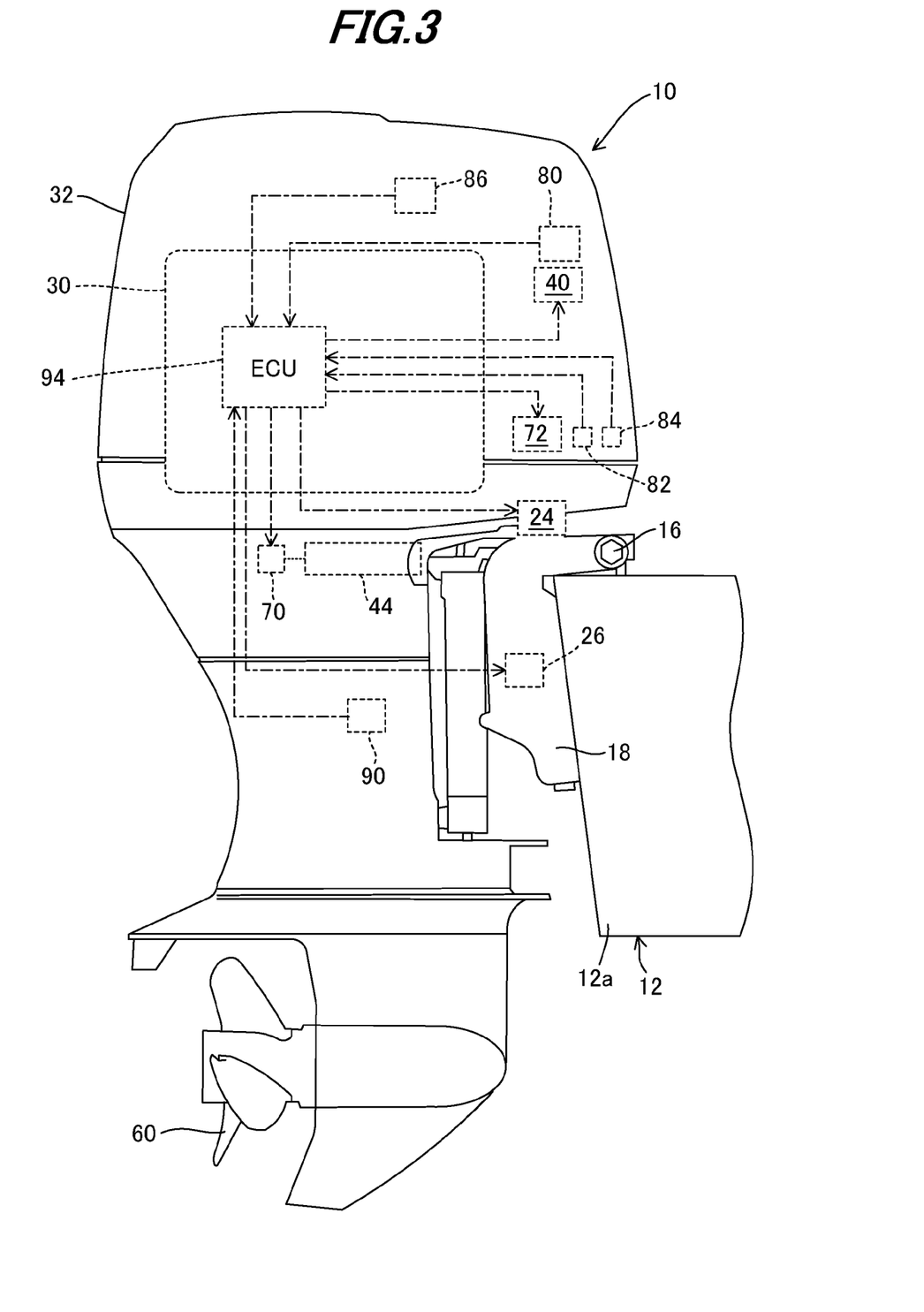
FIG. 3 is an enlarged side view of the outboard motor shown in FIG. 1.

In FIGS. 1 to 3, a symbol 10 indicates an outboard motor. As illustrated, the outboard motor 10 is clamped (fastened) to the stern or transom of a boat (hull) 12.

As shown in FIG. 2, the outboard motor 10 is fastened to the boat 12 through a swivel case 14, tilting shaft 16 and stern brackets 18. The outboard motor 10 is equipped with a mount frame 20 and shaft 22. The shaft 22 is housed in the swivel case 14 to be rotatable about the vertical axis such that the outboard motor 10 can be rotated about the vertical axis relative to the boat 12. The mount frame 20 is fixed at its upper end and lower end to a frame (not shown) constituting a main body of the outboard motor 10.

An electric steering motor (actuator) 24 for operating the shaft 22 and a power tilt-trim unit 26 for regulating a tilt angle and trim angle of the outboard motor 10 relative to the boat 12 are installed near the swivel case 14. The output shaft of the steering motor 24 is connected to the upper end of the mount frame 20 via a speed reduction gear mechanism 28. Specifically, a rotational output of the steering motor 24 is transmitted to the mount frame 20 via the speed reduction gear mechanism 28, whereby the outboard motor 10 is steered about the shaft 22 as a steering axis to the right and left directions (steered about the vertical axis).

The power tilt-trim unit 26 integrally comprises a hydraulic cylinder 26a for adjusting the tilt angle and a hydraulic cylinder 26b for adjusting the trim angle. When the hydraulic cylinders 26a, 26b are extended and contracted, the swivel case 14 is rotated about the tilting shaft 16 as a rotational axis, thereby tiling up/down and trimming up/down the outboard motor 10.

An internal combustion engine (hereinafter referred to as the "engine") 30 is disposed in the upper portion of the outboard motor 10. The engine 30 comprises a spark-ignition, water-cooling gasoline engine with a displacement of 2,200 cc. The engine 30 is located above the water surface and covered by an engine cover 32.

An intake pipe 34 of the engine 30 is connected to a throttle body 36. The throttle body 36 has a throttle valve 38 installed therein and an electric throttle motor (actuator) 40 for opening and closing the throttle valve 38 is integrally disposed thereto.

The output shaft of the throttle motor 40 is connected to the throttle valve 38 via a speed reduction gear mechanism (not shown) disposed near the throttle body 36. The throttle motor 40 is operated to open and close the throttle valve 38, thereby regulating the flow rate of the air sucked in the engine 30 to control the engine speed.

The outboard motor 10 further comprises a drive shaft (vertical shaft) 42 installed parallel with the vertical axis to be rotatably supported, a torque converter 44 interposed between the engine 30 and drive shaft 42, a hydraulic pump 46 that is attached to the drive shaft 42 and pumps operating oil to a lubricated portion of the engine 30, the torque converter 44 and the like, and a reservoir 50 for reserving the operating oil.

The upper end of the drive shaft 42 is connected to a crankshaft 52 of the engine 30 through the torque converter 44 and the lower end thereof is connected via a shift mechanism 54 with a propeller shaft 56 supported to be rotatable about the horizontal axis. One end of the propeller shaft 56 is attached with a propeller 60. Thus the drive shaft 42 connects the engine 30 with the propeller 60.

Figure 4:
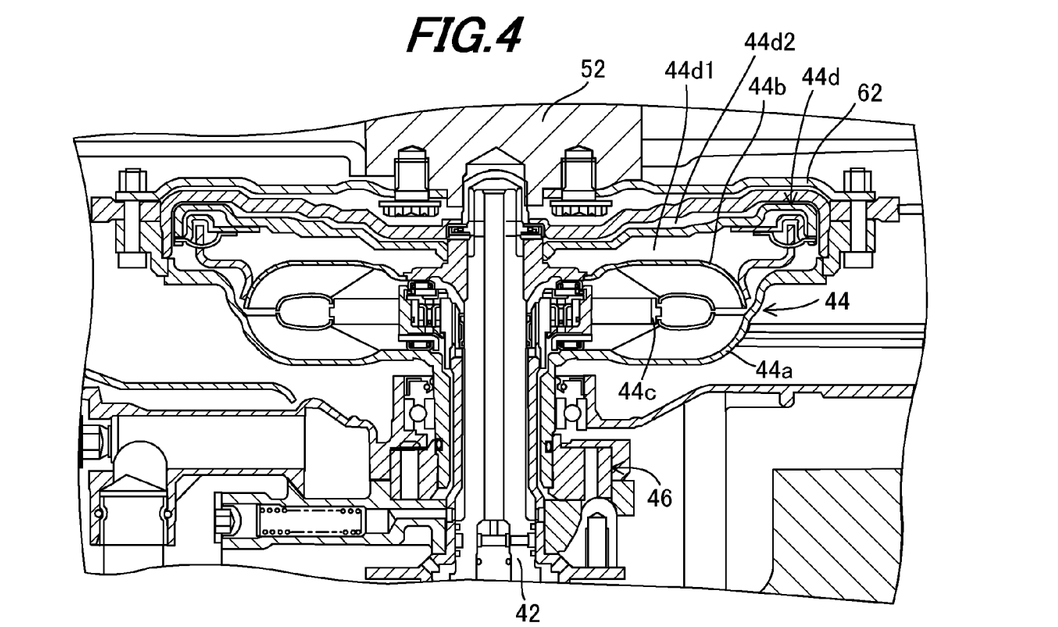
FIG. 4 is an enlarged sectional view showing a region around a torque converter shown in FIG. 2.

FIG. 4 is an enlarged sectional view showing a region around the torque converter 44 shown in FIG. 2.

As shown in FIG. 4, the torque converter 44 includes a pump impeller 44a connected to the crankshaft 52 through a drive plate 62, a turbine runner 44b that is installed to face the pump impeller 44a to receive/discharge the operating oil and connected to the drive shaft 42, a stator 44c installed between the pump impeller 44a and turbine runner 44b, a lockup clutch 44d and other components.

Figure 5:
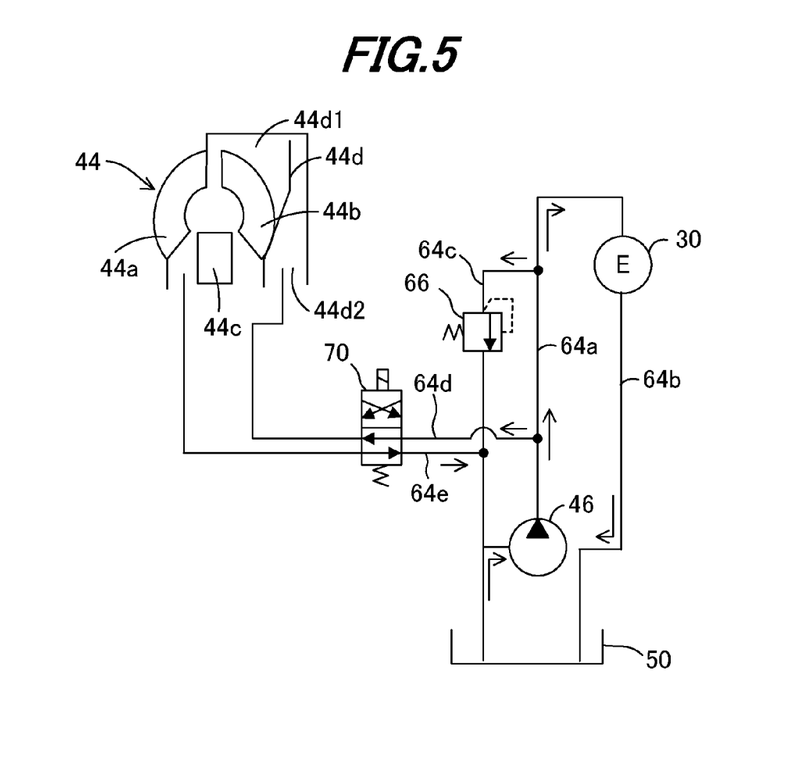
FIG. 5 is a hydraulic circuit diagram schematically showing the torque converter, a hydraulic pump and other components shown in FIG. 2.

FIG. 5 is a hydraulic circuit diagram schematically showing the torque converter 44, hydraulic pump 46, etc.

The hydraulic pump 46 driven by the engine 30 pumps up the operating oil in the reservoir 50 and forwards it to a first oil passage 64a. The pressurized operating oil forwarded to the first oil passage 64a is supplied to the lubricated portion of the engine 30 or the like and then returns to the reservoir 50 through a second oil passage 64b.

The first oil passage 64a is provided with a third oil passage 64c connecting the first oil passage 64a with an intake hole of the hydraulic pump 46. The third oil passage 64c is interposed with a relief valve 66 that opens when the pressure of the operating oil supplied to the engine 30 is at or above a defined value and closes when it is below the defined value.

A fourth oil passage 64d for circulating the operating oil supplied to the torque converter 44 is connected to the first oil passage 64a at a point between a discharge hole of the hydraulic pump 46 and a branch point of the first and third oil passages 64a, 64c. A fifth oil passage 64e for circulating the operating oil returning from the torque converter 44 to the hydraulic pump 46 is connected to the third oil passage 64c at a location downstream of the relief valve 66. The fourth and fifth oil passages 64d, 64e are installed with a lockup control valve 70 for controlling the operation of the lockup clutch 44d.

The lockup control valve 70 is a solenoid valve. The output of the valve 70 is connected to a piston chamber 44d1 of the lockup clutch 44d of the torque converter 44, and also connected to a chamber (rear chamber) 44d2 disposed in the rear of the piston chamber 44d1. The lockup control valve 70 switches the oil passage upon being magnetized/demagnetized, thereby controlling the ON/OFF state (engagement/release) of the lockup clutch 44d.

Specifically, when the lockup control valve 70 is magnetized, the operating oil is supplied to the piston chamber 44d1 and discharged from the rear chamber 44d2 so as to make the lockup clutch 44d ON (engaged), and when the valve 70 is demagnetized (the status in FIG. 5; initial condition), the operating oil is supplied to the rear chamber 44d2 and discharged from the piston chamber 44d1 so as to make the lockup clutch 44d OFF (released). Since the details of the aforementioned torque converter 44 is disclosed in '498, further explanation is omitted here.

The explanation of FIG. 2 will be resumed. The shift mechanism 54 comprises a forward bevel gear 54a and reverse bevel gear 54b which are connected to the drive shaft 42 to be rotated, a clutch 54c which can engage the propeller shaft 56 with either one of the forward bevel gear 54a and reverse bevel gear 54b, and other components.

The interior of the engine cover 32 is disposed with an electric shift motor (actuator) 72 that drives the shift mechanism 54. The output shaft of the shift motor 72 can be connected via a speed reduction gear mechanism (not shown) with the upper end of a shift rod 54d of the shift mechanism 54. Therefore, when the shift motor 72 is operated, its output appropriately displaces the shift rod 54d and a shift slider 54e to move the clutch 54c to one shift position from among a forward position, reverse position and neutral position.

When the shift position is forward or reverse, the rotational output of the drive shaft 42 is transmitted via the shift mechanism 54 to the propeller shaft 56 to rotate the propeller 60 in one of the directions making the boat 12 move forward or rearward. The outboard motor 10 is equipped with a power source (not shown) such as a battery or the like attached to the engine 30 to supply operating power to the motors 24, 40, 72, etc.

As shown in FIG. 3, a throttle opening sensor 80 is installed near the throttle valve 38 and produces an output or signal indicative of opening of the throttle valve 38, i.e., throttle opening TH. A shift position sensor 82 installed near the shift rod 54d produces an output or signal corresponding to a shift position (neutral, forward or reverse) and a neutral switch 84 also installed near the shift rod 54d produces an ON signal when the shift position is neutral and an OFF signal when it is forward or reverse.

A crank angle sensor 86 is installed near the crankshaft 52 of the engine 30 and produces a pulse signal at every predetermined crank angle. A drive shaft rotation speed sensor 90 is installed near the drive shaft 42 and produces an output or signal indicative of rotation speed of the drive shaft 42.

The outputs of the foregoing sensors and switch are sent to an Electronic Control Unit (ECU) 94 disposed in the outboard motor 10. The ECU 94 has a microcomputer including a CPU, ROM, RAM and other devices and installed in the engine cover 32 of the outboard motor 10.

As shown in FIG. 1, a steering wheel 102 is installed near a cockpit (the operator's seat) 100 of the boat 12 to be manipulated or rotated by the operator. A steering angle sensor 104 installed near a shaft (not shown) of the steering wheel 102 produces an output or signal corresponding to the steering angle of the steering wheel 102.

A remote control box 106 provided near the cockpit 100 is equipped with a shift/throttle lever 110 installed to be manipulated by the operator. Upon manipulation, the lever 110 can be swung in the front-back direction from the initial position and is used by the operator to input a shift position change command and engine speed regulation command. A lever position sensor 112 is installed in the remote control box 106 and produces an output or signal corresponding to a position of the lever 110.

An inclination angle sensor (inclination angle detector) 114 is installed near the cockpit 100. The inclination angle sensor 114 having a pendulum attached with magnets detects displacement of the pendulum from the vertical axis by using a reed switch or the like (none of which are shown) and produces an output or signal corresponding to an inclination angle $\alpha$ of the boat 12 relative to the horizontal surface. More precisely, the sensor 114 outputs a Lo signal when the angle $\alpha$ is equal to or less than a predetermined angle $\alpha$ref (explained later) and a Hi signal when it exceeds the predetermined angle $\alpha$ref. The outputs of the sensors 104, 112 and 114 are also sent to the ECU 94.

Based on the inputted outputs, the ECU 94 controls the operations of the motors and ON/OFF state of the lockup clutch 44*d* of the torque converter 44.

Figure 6:
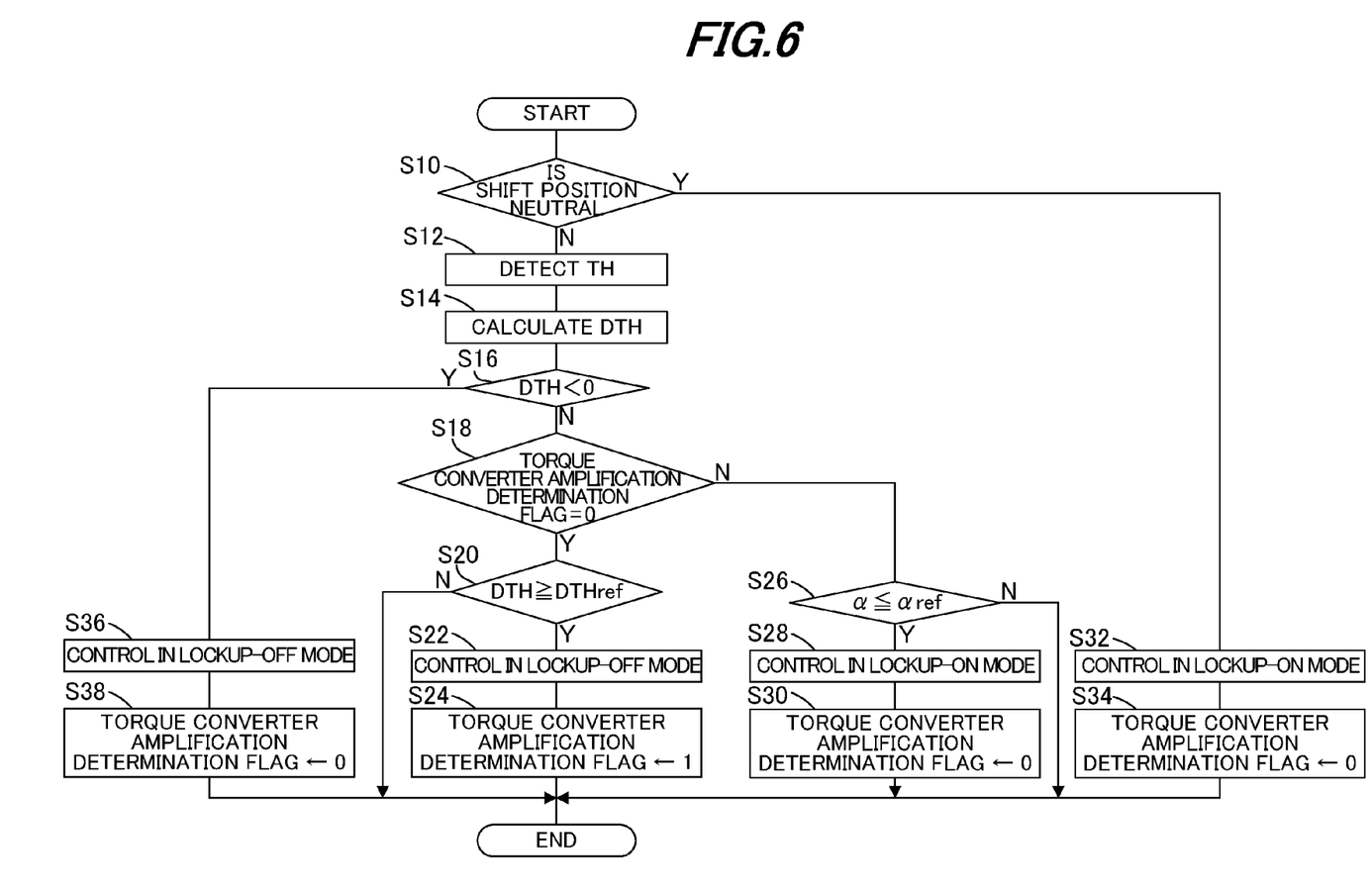
FIG. 6 is a flowchart showing the control of ON/OFF state of a lockup clutch of the torque converter shown in FIG. 1, etc.

FIG. 6 is a flowchart showing the control of ON/OFF state of the lockup clutch 44*d*. The illustrated program is executed by the ECU 94 at a predetermined interval, e.g., 100 milliseconds.

The program begins in S10, in which it is determined whether the shift position is neutral. This determination is made by checking as to whether the neutral switch 84 outputs the ON signal. When the result in S10 is negative, the program proceeds to S12, in which the throttle opening TH is detected or calculated from the output of the throttle opening sensor 80 and to S14, in which a change amount (variation) DTH of the detected throttle opening TH per a predetermined time (e.g., 500 milliseconds) is calculated.

The program proceeds to S16, in which it is determined whether the engine 30 is in a decelerating condition. The determination in S16 whether the engine 30 (precisely, the boat 12) is decelerating is made by checking as to whether the change amount DTH of the throttle opening TH is less than 0 degree. In other words, when the change amount DTH is a negative value, the engine 30 is determined to be decelerating and when the change amount DTH is 0 or a positive value, it is determined to be at a constant speed or accelerating.

When the result in S16 is negative, the program proceeds to S18, in which it is determined whether a bit of an amplification determination flag of the torque converter 44 (torque converter amplification determination flag) is 0. As explained below, the bit of this flag is set to 1 when a condition where the output torque of the engine 30 is amplified through the torque converter 44 and transmitted to the drive shaft 42 (i.e., where the operation of the outboard motor 10 is in a range (torque amplification range) that the torque is to be amplified by the torque converter 44 to accelerate the boat 12) is established, and reset to 0 when the output torque of the engine 30 is not amplified (i.e., the operation of the outboard motor 10 is out of the torque amplification range).

Since the initial value of the bit of the torque converter amplification determination flag is 0, the result in S18 in the first program loop is generally affirmative and the program proceeds to S20, in which it is determined whether the engine 30 is in an accelerating condition. Specifically, the calculated change amount DTH of the throttle opening TH is compared with a predetermined value (threshold value) DTHref and, when the change amount DTH is equal to or greater than the predetermined value DTHref, the engine 30 is determined to be in the accelerating condition. The predetermined value DTHref is set to a value (e.g., 0.5 degree) enabling to determine whether the engine 30 is in the accelerating condition.

When the result in S20 is negative, i.e., the engine 30 is neither decelerating nor accelerating but the boat 12 cruises at a constant speed, the remaining steps are skipped and when the result is affirmative, the program proceeds to S22, in which the torque converter 44 is controlled in a lockup-OFF mode. The lockup-OFF mode demagnetizes the lockup control valve 70 to make the lockup clutch 44*d* OFF. As a result, the output torque of the engine 30 is amplified by the torque converter 44 and transmitted to the drive shaft 42, thereby improving acceleration performance.

The program proceeds to S24, in which a bit of the torque converter amplification determination flag is set to 1 and the present program loop is terminated. Since the bit of this flag is set to 1, the result in S18 in the next and subsequent loops is negative and the program proceeds to S26. In other words, when the outboard motor 10 is in the condition where the output torque of the engine 30 is amplified by the torque converter 44 to accelerate the boat 12, i.e., when the engine speed is increased, the program proceeds to S26 onward.

In S26, it is determined whether the boat 12 is planing. This determination is made by checking as to whether the inclination angle α of the boat 12 relative to the horizontal surface in the front-back direction is equal to or less than the predetermined angle (threshold value) αref based on the output (Hi or Lo signal) of the inclination angle sensor 114.

Figure 7A:
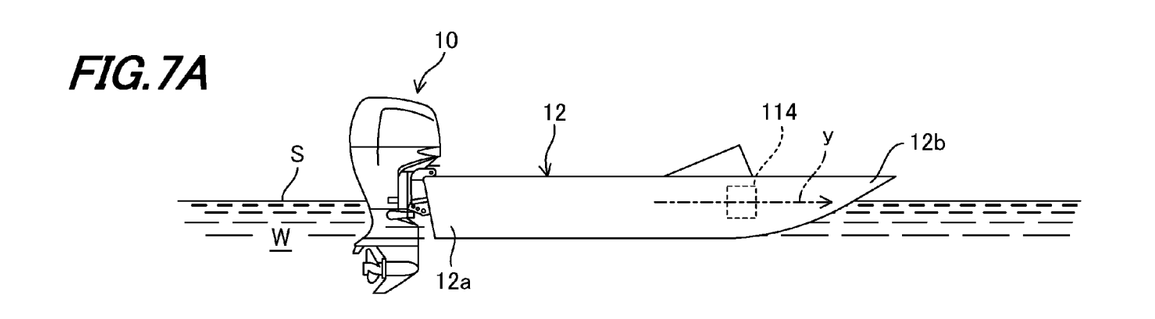
FIG. 7A, FIG. 7B and FIG. 7C are a set of explanatory views for explaining the process of the FIG. 6 flowchart.
Figure 7B:
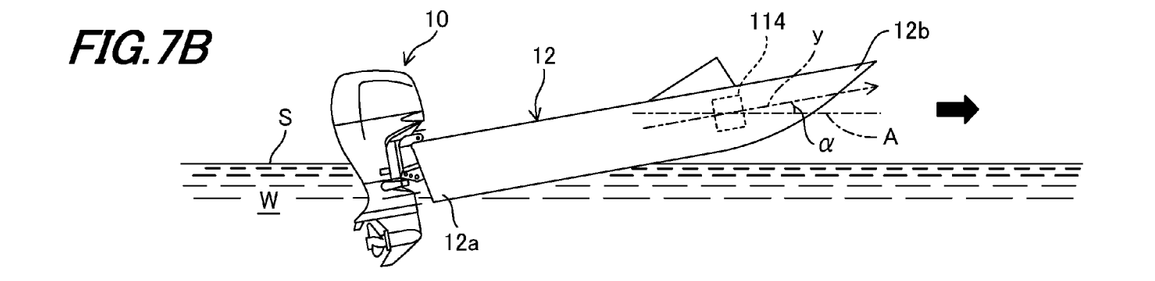
Figure 7C:
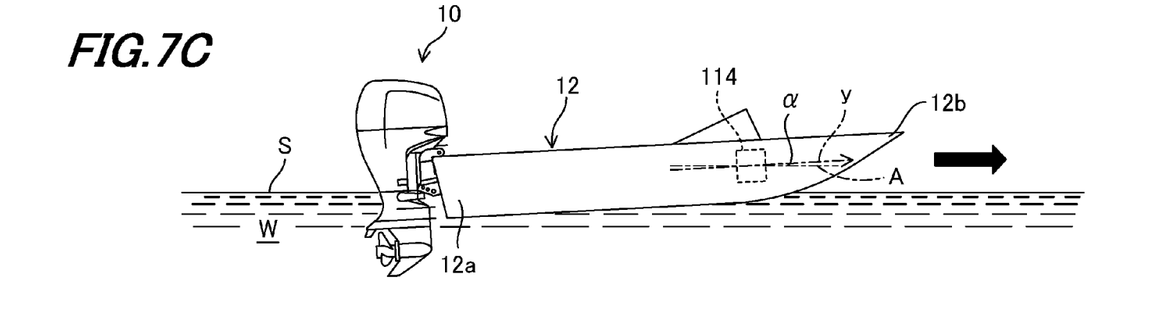

FIG. 7A, FIG. 7B and FIG. 7C are a set of explanatory views for explaining the process of the FIG. 6 flowchart. In the drawings (e.g., in FIGS. 7A-7C), a symbol y indicates the front-back direction of the outboard motor 10, a symbol A the horizontal surface, a symbol W seawater or freshwater, and a symbol S the water surface.

FIG. 7A shows the boat 12 in the stop condition or traveling at relatively low speed. In this condition, when the engine 30 is accelerated and the speed of the boat 12 is increased, as shown in FIG. 7B, a bow 12*b* of the boat 12 is lifted up and the stern 12*a* thereof is sunk down (the boat speed lies the so-called "hump" region). Since the inclination angle α exceeds the predetermined angle αref at this time, the inclination angle sensor 114 outputs the Hi signal.

Subsequently, as shown in FIG. 7C, when the acceleration is completed, i.e., the torque amplification range (acceleration range) is saturated and ended, the boat speed becomes stable at the maximum speed or thereabout, while the bow 12*b* moves down and the boat 12 is planing. Since the inclination angle α is decreased to or below the predetermined angle αref at this time, the inclination angle sensor 114 outputs the Lo signal.

Specifically, when the engine 30 is accelerated (the result in S18 is negative), in S26, it is determined whether the inclination angle α of the boat 12 relative to the horizontal surface A in the front-back direction y is equal to or less than the predetermined angle αref, and when the result is affirmative, it is determined that the acceleration is completed and the boat 12 is planing. The predetermined angle αref is set to a value (e.g., 5 degrees) enabling to determine whether the boat 12 is planing.

When the result in S26 is affirmative, the program proceeds to S28, in which the torque converter 44 is controlled in a lockup-ON mode. The lockup-ON mode magnetizes the lockup control valve 70 to make the lockup clutch 44*d* ON. As a result, since the crankshaft 52 of the engine 30 and the drive shaft 42 are directly connected, the boat 12 can reach the maximum speed (in a range of the engine performance) while preventing slippage or the like of the torque converter 44, thereby improving speed performance.

Thus, when it is determined that the torque amplification range is ended and the boat 12 is planing, the lockup clutch 44*d* is made ON. After the process of S28, in S30, the bit of the torque converter amplification determination flag is reset to 0.

When the result in S26 is negative, since it means that the boat 12 is not planing, in other words, the acceleration is not completed, the process of S28 and S30 is skipped and the program is terminated.

When the result in S10 is affirmative, i.e., the shift position is neutral, the program proceeds to S32, in which the torque converter 44 is controlled in the lockup-ON mode, i.e., the lockup clutch 44*d* is made ON, and to S50, in which the bit of the torque converter amplification determination flag is reset to 0.

When the result in S16 is affirmative, i.e., the engine 30 is in the decelerating condition, the program proceeds to S36, in which the torque converter 44 is controlled in the lockup-OFF mode, i.e., the lockup clutch 44*d* is made OFF, and to S54, in which the bit of the torque converter amplification determination flag is reset to 0 and the program is terminated.

As stated above, this embodiment is configured to have an apparatus for (and a method of) controlling an outboard motor (10) mounted on a stern of a boat (12) and having an internal combustion engine (30) to power a propeller (60), a drive shaft (42) that connects the engine and the propeller, and a torque converter (44) that is interposed between the engine and the drive shaft and is equipped with a lockup clutch (44d), comprising a planing determiner (ECU 94, S26) that determines whether the boat is planing, and a clutch ON unit (ECU 94, S28) that makes the lockup clutch ON when the boat is determined to be planing.

Specifically, it is configured to detect that the acceleration is completed (the torque amplification range is ended) by determining whether the boat 12 is planing, and when the boat 12 is planing, determine completion of the acceleration and make the lockup clutch 44d ON. In other words, when the boat 12 has reached the maximum speed or thereabout after completing the acceleration, the lockup clutch 44d can be promptly made ON (engaged). As a result, the boat speed can reach the maximum speed while preventing slippage of the torque converter 44, thereby improving speed performance and fuel efficiency.

The apparatus further includes an inclination angle detector (inclination angle sensor 114) that detects an inclination angle ($\alpha$) of the boat relative to horizontal surface in a front-back direction, and an inclination angle determiner (ECU 94, S26) that determines whether the detected inclination angle is equal to or less than a predetermined angle ($\alpha$ref) when the engine is accelerated, and the planing determiner determines that the acceleration is completed and the boat is planing when the inclination angle is equal to or less than the predetermined angle (S26). With this, it becomes possible to accurately detect that the acceleration is completed, and since the lockup clutch 44d is made ON under this condition, speed performance can be further improved.

In the apparatus, the inclination angle detector is an inclination angle sensor (114) installed in the boat. With this, it becomes possible to accurately detect the inclination angle $\alpha$ of the boat 12 relative to the horizontal surface in the front-back direction with the simple structure.

The apparatus further includes an acceleration determiner (ECU 94, S14, S20) that calculates a change amount (DTH) of opening (TH) of a throttle valve (38) of the engine and determines that the engine is in an accelerating condition when the calculated change amount is equal to or greater than a predetermined value (DTHref), and the inclination angle determiner determines whether the detected inclination angle is equal to or less than the predetermined angle when the acceleration determiner determines that the engine is in the accelerating condition (S26). With this, it becomes possible to accurately detect that the engine is in the accelerating condition.

It should be noted that, although the inclination angle sensor 114 is concretely described in the above embodiment, it suffices if it can detect the inclination or angle $\alpha$ of the boat 12 in the front-back direction y and hence, an optical or magnetic potentiometer or encoder may be used instead.

It should also be noted that, although the predetermined angle $\alpha$ref, predetermined value DTHref, displacement of the engine 30 and other values are indicated with specific values in the foregoing, they are only examples and not limited thereto.

Japanese Patent Application No. 2008-270216 filed on Oct. 20, 2008 is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling an outboard motor mounted on a stern of a boat and having an internal combustion engine to power a propeller, a drive shaft that connects the engine and the propeller, and a torque converter that is interposed between the engine and the drive shaft and is equipped with a lockup clutch, comprising:
   a planing determiner that determines whether the boat is planing;
   a clutch ON unit that makes the lockup clutch ON when the boat is determined to be planing
   an inclination angle detector that detects an inclination angle of the boat relative to horizontal surface in a front-back direction; and
   an inclination angle determiner that determines whether the detected inclination angle is equal to or less than a predetermined angle when the engine is accelerated, and the planing determiner determines that the acceleration is completed and the boat is planing when the inclination angle is equal to or less than the predetermined angle.

2. The apparatus according to claim 1, wherein the inclination angle detector is an inclination angle sensor installed in the boat.

3. The apparatus according to claim 1, further including:
   an acceleration determiner that calculates a change amount of opening of a throttle valve of the engine and determines that the engine is in an accelerating condition when the calculated change amount is equal to or greater than a predetermined value, and the inclination angle determiner determines whether the detected inclination angle is equal to or less than the predetermined angle when the acceleration determiner determines that the engine is in the accelerating condition.

4. A method of controlling an outboard motor mounted on a stern of a boat and having an internal combustion engine to power a propeller, a drive shaft that connects the engine and the propeller, a torque converter that is interposed between the engine and the drive shaft and is equipped with a lockup clutch and an inclination angle detector that detects an inclination angle of the boat relative to horizontal surface in a front-back direction, comprising steps of:
   determining whether the boat is planing;
   making the lockup clutch ON when the boat is determined to be planing;
   determining whether the detected inclination angle is equal to or less than a predetermined angle when the engine is accelerated, and
   determining determines that the acceleration is completed and the boat is planing when the inclination angle is equal to or less than the predetermined angle.

5. The method according to claim 4, wherein the inclination angle detector is an inclination angle sensor installed in the boat.

6. The method according to claim 4, further including a step of:
   calculating a change amount of opening of a throttle valve of the engine and determining that the engine is in an accelerating condition when the calculated change amount is equal to or greater than a predetermined value, and step of inclination angle determining determines whether the detected inclination angle is equal to or less than the predetermined angle when the step of acceleration determining determines that the engine is in the accelerating condition.

* * * * *